W. A. Sweet.
Steam Valve.

No. 95,285. Patented Sep. 28, 1869.

Section at A'

Section at B

Witnesses
Geo. W. Harwood
Reuben Murray

Inventor
Wm. A. Sweet

United States Patent Office.

WILLIAM A. SWEET, OF SYRACUSE, NEW YORK.

Letters Patent No. 95,285, dated September 28, 1869.

IMPROVEMENT IN STEAM-VALVES.

The Schedule referred to in these Letters Patent and making part of the same.

*To all whom it may concern:*

Be it known that I, WILLIAM A. SWEET, of the city of Syracuse, county of Onondaga, and State of New York, have invented a new and useful Improvement in "Steam-Valves;" and I do hereby declare the following to be a sufficiently clear and exact description of my invention, reference being made to the accompanying drawings, and letters thereon, that any one skilled in such matters may make and use the same.

The nature of my invention consists in affixing a device to what is termed, in the mechanic arts, the segmental slide valve, in such a manner that all back pressure upon the valve is removed from the valve-stem or rock-shaft, thereby permitting the stem to work freely upon its bearings, and thereby preventing all one-sided wearing of it and its bearings.

Like letters refer to like parts in all the views.

A is the valve-chamber, of any desirable form and size to suit the style and capacity of the engine.

Figure 2:
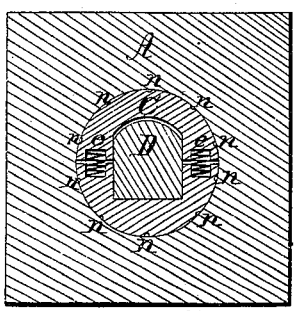
Figure 2 is a sectional view through A' of fig. 1.
Figure 1:
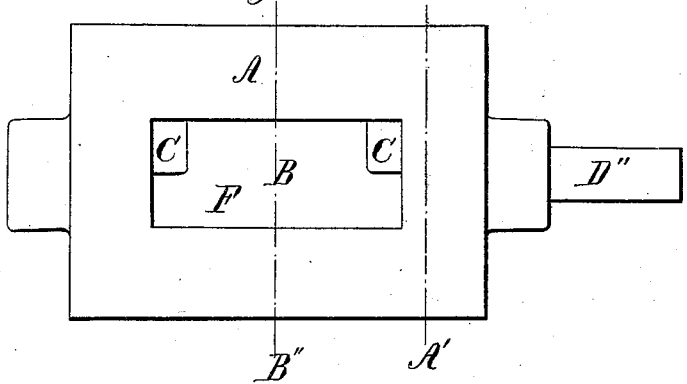
Figure 1 is a view of the valve-chamber, showing the side where the steam is admitted, and the valve in working-position.
Figure 3:
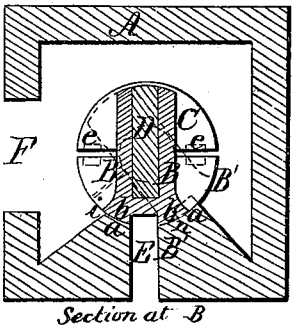
Figure 3 is a sectional view through B" of fig. 1.
Figure 4:
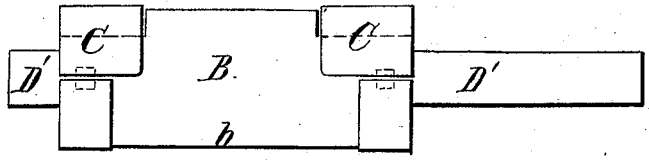
Figure 4 is a side elevation of a valve detached from the seat, but mounted upon the valve-stem or rock-shaft, and having my improvements added, as seen at C C.

B is the valve, the face of which is the segment of a circle whose centre is the axis of the valve-stem or rock-shaft D, and from which centre the seat of the valve B' is also described, as best illustrated at fig. 3.

Projecting from the face of the valve $b\ b$, are two wings or flanges, as at B B, fig. 3, between which the valve-stem, as at D, operates to move or rock the valve in opening or closing the port at E, fig. 3.

Said stem or shaft D is made to fit snugly between said flanges, to prevent any lost motion in operating the valve, but a sufficient amount of freedom must be allowed to permit the valve to adjust itself to the seat in case the axis of the valve-stem should not coincide with the face of the seat.

To overcome any back pressure upon the valve that might lift it from its seat, springs have been introduced between the edge of the stem and the bottom of the recess between the two flanges B B, and consequently, all the back pressure of the valve was thrown upon the bearings D' D' of the valve-stem, and upon the sides of said bearings opposite to the pressure, and the bearings are thereby gradually worn one-sided, and much expense is thereby necessarily incurred in refitting the several working-parts, since, by turning off the stems, the seats require to be bushed, &c.

To overcome all such difficulties, I have introduced the supplemental bearings C, which span the valve-stem at the ends of the valve like a semicircular saddle, the convex surface of which is an arc whose centre is the axis of the valve-stem or rock-shaft.

Said bearings or saddles are fitted into corresponding seats in the valve-chamber, and they are made sufficiently long to give abundant wearing-surface, and against said surfaces the back pressure of the valve is sustained, thereby completely relieving the valve-stem or rock-shaft of all objectionable back or one-sided pressure.

A sufficient amount of space is left between the plane faces of these saddles, and the plane faces of the bearings of the valve, as at $e\ e$, to compensate for any differences between the ends or journals of the valve and the seats, that may be caused by expansion or by the wearing of the faces, either of the valve or its seat; and to prevent any noise by the two surfaces striking together, springs are inserted between them, as shown at $e\ e$.

By such a construction and arrangement, the valve-stem or rock-shaft is only required to reciprocate the valve, and in practice, is found to work more freely than by the old method, and its durability is very greatly improved, while the cost of refitting, in case of any repairs, is equally diminished.

Having thus briefly described my invention,

What I claim, and desire to secure by Letters Patent, is—

The supplemental bearings or saddles C, substantially as described and set forth.

WM. A. SWEET.

Witnesses:
GEO. W. HARWOOD,
REUBEN MURRAY.